United States Patent
Bacon et al.

(10) Patent No.: US 7,150,009 B2
(45) Date of Patent: Dec. 12, 2006

(54) SPACE-EFFICIENT OBJECT MODELS FOR OBJECT-ORIENTED PROGRAMMING LANGUAGES

(75) Inventors: David F. Bacon, Sleepy Hollow, NY (US); Stephen J. Fink, Yorktown Heights, NY (US); David P. Grove, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/315,270

(22) Filed: Dec. 10, 2002

(65) Prior Publication Data

US 2004/0111703 A1    Jun. 10, 2004

(51) Int. Cl.
*G06F 9/44* (2006.01)
*G11C 29/00* (2006.01)

(52) U.S. Cl. .................. 717/127; 714/38; 717/131
(58) Field of Classification Search ......... 717/127–131
See application file for complete search history.

(56) References Cited

U.S. PATENT DOCUMENTS

| | | | | |
|---|---|---|---|---|
| 5,331,579 A * | 7/1994 | Maguire et al. | ............... | 703/2 |
| 6,556,982 B1 * | 4/2003 | McGaffey et al. | ............ | 706/50 |
| 6,954,923 B1 * | 10/2005 | Yates et al. | ................. | 717/130 |

* cited by examiner

*Primary Examiner*—Tuan Dam
*Assistant Examiner*—Chuck Kendall
(74) *Attorney, Agent, or Firm*—Ference & Associates

(57) ABSTRACT

A method for implementing an object model for an object-oriented programming language. Also contemplated is a method whereby some object state is materialized directly in those objects deemed likely to use such a state, but is externalized for those objects deemed unlikely to use the state.

25 Claims, 1 Drawing Sheet

SPACE-EFFICIENT OBJECT MODELS FOR OBJECT-ORIENTED PROGRAMMING LANGUAGES

FIELD OF THE INVENTION

The present invention relates generally to computer program execution systems, and more particularly to software systems implementing object-oriented programming languages.

BACKGROUND OF THE INVENTION

In computer program execution systems, the choice of object model plays a central role in the design of any object-oriented language implementation. The object model dictates how objects will be represented in storage. It is widely recognized that the best object model will maximize the efficiency of frequent language operations while minimizing storage overhead.

A fundamental property of object-oriented languages is that the operations performed on an object depend upon the object's run-time type, rather than its compile-time type. Therefore, in any object model, each object must at a minimum contain a run-time type identifier, typically a pointer to a virtual method table.

Some modern object-oriented languages, like Java™, require additional per-object units of state to support richer functionality including garbage collection (see "Garbage Collection: Algorithms for Dynamic Memory Management" by R. Jones and R. Lins, John Wiley and Sons, 1996), hashing (see "Sorting and Searching", Volume 3 of "The Art of Computer Programming" by D. Knuth, Addison-Wesley, 1973), and synchronization (see "The Java™ Language Specification" by J. Gosling, B. Joy, and G. Steele, Addison-Wesley, 1996). Generally, each extra unit of state imposes extra storage overhead for each object.

In view of the foregoing, the computer science literature has presented some object model implementation techniques designed to reduce the per-object storage overhead.

Some work has focused on reducing the per-object space overhead needed to represent an object's run-time type. This is covered in at least the following references: "Exploiting prolific types for memory management and optimizations", Conference Record of the ACM Conference on Principles of Programming Languages, January 2002 by Y. Shuf et al.; "Space- and time-efficient implementation of the Java object model", Proceedings of the European Conference on Object-Oriented Programming, June 2002 by D. Bacon et al.; "Data Size Optimizations for Java Programs", by C. Scott Ananian and Martin Rinard, [http://]www.cag.lcs.mit.edu/~cananian/Publications/sas02.pdf.

The initial Java virtual machine from Sun performed synchronization on objects via a hash table, itself synchronized with a global lock. The resulting system had poor synchronization performance, which turned out to be quite common in many Java programs.

A body of subsequent work improved the space and time overhead of the original Java object model with respect to locking. This is covered in at least the following references: "Monitors and exceptions: how to implement Java efficiently", Concurrency: Practice and Experience 100, 11–13 (1998), by A. Krall and M. Probst; "Thin locks: featherweight synchronization for Java", Proceedings of the SIGPLAN Conference on Programming Language Design and Implementation, Montreal, Canada, June 1998, by D. Bacon et al.; "Locking and unlocking mechanism for controlling concurrent access to objects", U.S. Pat. No. 6,247,025, issued 12 Jun. 2001 to D. Bacon; "A study of locking objects with bimodal fields", OOPSLA '99 Conference Proceedings: Object-Oriented Programming Systems, Languages, and Applications, Denver, Colo., October 1999, by T. Onodera and K. Kawachiya; "SableVM: A research framework for efficient execution of Java bytecode", Proceedings of the Java Virtual Machine Research and Technology Symposium, Monterey, Calif., April 2001 by E. Gagnon and L. Hendren; "Lightweight monitor in Java virtual machine", Proceedings of the Third Workshop on Interaction Between Compilers and Computer Architectures, San Jose, Calif., October 1998, by B. S. Yang et al.; "An efficient meta-lock for implementing ubiquitous synchronization", OOPSLA '99 Conference Proceedings: Object-Oriented Programming Systems, Languages, and Applications, Denver, Colo., October 1999 by O. Agesen et al.; "Marmot: an optimizing compiler for Java", Software—Practice and Experience, 30(3), 2000, by R. Fitzgerald et al.

All of the approaches just listed either sacrifice performance by imposing indirection into the locking sequence, or impose some per-object space overhead to represent locking state. Thus, it would be highly desirable to enable a system to reduce the per-object space overhead, while also minimizing the overhead due to indirection in the locking protocol.

Some other related work has focused on eliminating synchronization via compile-time analysis. This work is described in the following references: "Static analyses for eliminating unnecessary synchronization from Java programs", Static Analysis: Sixth International Symposium, Venice, Italy, September 1999, by J. Aldrich et al.; "Comprehensive synchronization elimination for Java", Tech. Report UW-CSE-00-10-01, Department of Computer Science, University of Washington, 2000, by J. Aldrich et al.; "Removing unnecessary synchronization in Java", Conference Proceedings: Object-Oriented Programming Systems, Languages, and Applications, Denver, Colo., 1999, by J. Bogda and U. Holzle; "Effective synchronization removal for Java", Proceedings of the SIGPLAN Conference on Programming Language Design and Implementation, Vancouver, British Columbia, June 2000, by E. Ruf.

Among the significant disadvantages of the efforts just listed is that they tend not to be capable of reducing object space overhead.

In view of the foregoing, a need has been recognized in connection with improving upon the shortcomings and disadvantages of conventional efforts.

SUMMARY OF THE INVENTION

In accordance with at least one presently preferred embodiment of the present invention, there is provided a method of implementing an object model for an object-oriented programming language. The object model is adapted to provide a method whereby an object state is materialized directly in those objects deemed likely to use the state, but externalized for those objects deemed unlikely to use the state.

In accordance with at least one embodiment of the present invention, there is represented a class of program state, S, for which each object O in the system must potentially have an instance, SO. The following steps are thence contemplated:

1) Predict by some policy the set of objects that will likely use the state S during its lifetime.

2) For each object O predicted to use state SO in its lifetime, materialize a representation of the state SO in the object's storage representation.

3) For each object O predicted not to use state SO in its lifetime, the following may apply: the first time the system attempts to use this state, materialize storage for SO in an auxiliary data structure called the "nursery," which the system can access by an indirect lookup mechanism.

4) As an optional step, at some convenient point during program execution, the system can evacuate the nursery: i.e., for each unit of state SO in the nursery, the system can move this state into the logically owning object O, and modify future execution of the program to access SO directly in the object's representation.

A significant advantage to be enjoyed by the above-described method is that if the system does not use the state for some objects, and the system can further predict which objects likely use the state, then the system saves space by not representing state for some objects, while still avoiding the performance impact of indirect access for most objects that are predicted to use the state.

In summary, one aspect of the invention provides a method of implementing an object model in an implementation of an object-oriented programming language, said method comprising the steps of: predicting a set of objects that will use an object-specific instance of a given state during the lifetime of each object; for each object predicted to use an object-specific instance of the given state, materializing a representation of the object-specific instance of the given state in a storage representation of the object; providing an auxiliary data structure; and for each object not predicted to use an object-specific instance of the given state: upon the first attempted use of its object-specific instance of the given state, materializing the object-specific instance of the given state in the auxiliary data structure.

An additional aspect of the invention provides an apparatus which implements an object model in an implementation of an object-oriented programming language, said apparatus comprising: a predictor which predicts a set of objects that will use an object-specific instance of a given state during the lifetime of each object; a first materializer which, for each object predicted to use an object-specific instance of the given state, materializes a representation of the object-specific instance of the given state in a storage representation of the object; an auxiliary data structure; and a second materializer which, for each object not predicted to use an object-specific instance of the given state: upon the first attempted use of its object-specific instance of the given state, materializes the object-specific instance of the given state in the auxiliary data structure.

An further aspect of the invention provides a program storage device readable by machine, tangibly embodying a program of instructions executable by the machine to perform method steps for implementing an object model in an implementation of an object-oriented programming language, said method comprising the steps of: predicting a set of objects that will use an object-specific instance of a given state during the lifetime of each object; for each object predicted to use an object-specific instance of the given state, materializing a representation of the object-specific instance of the given state in a storage representation of the object; providing an auxiliary data structure; and for each object not predicted to use an object-specific instance of the given state: upon the first attempted use of its object-specific instance of the given state, materializing the object-specific instance of the given state in the auxiliary data structure.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
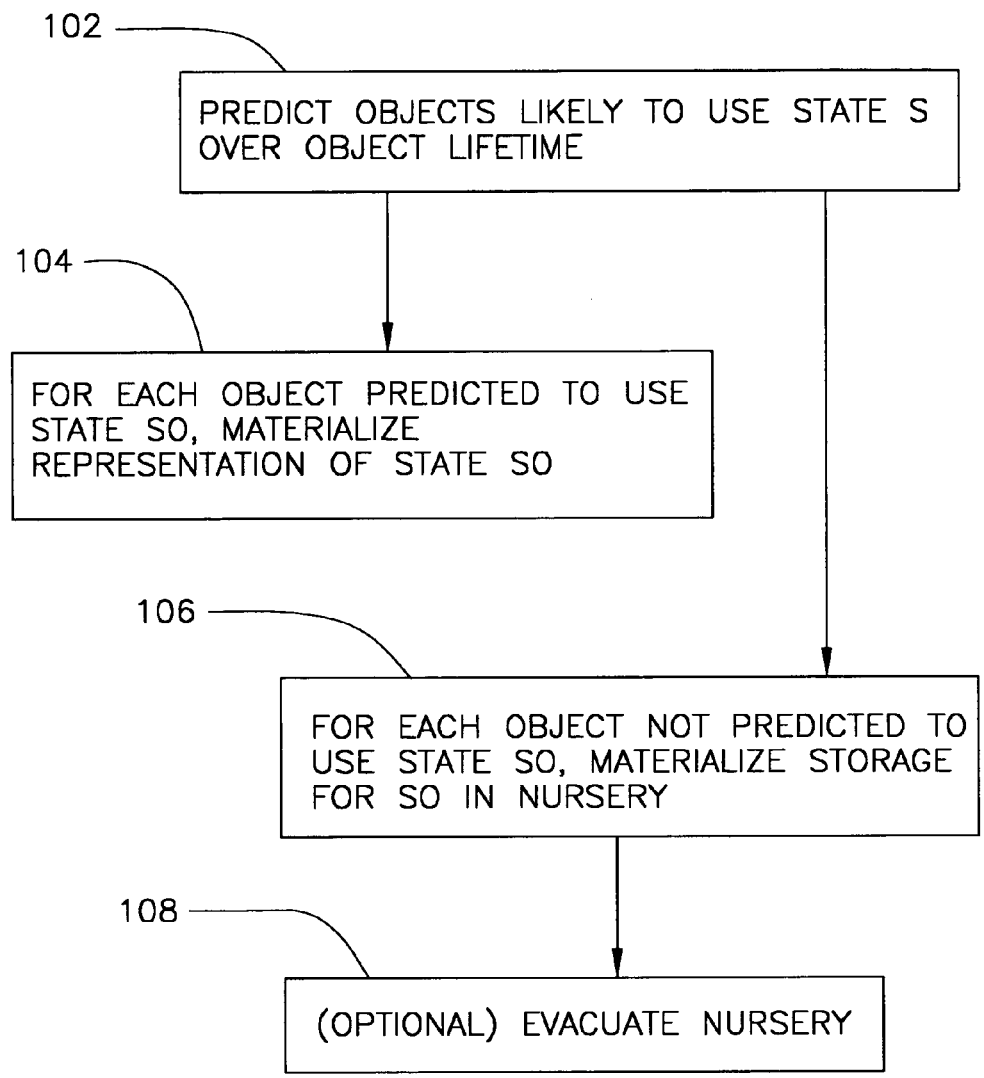
FIG. 1 is a block diagram illustrating a method for implementing an object model in an implementation of an object-oriented programming language.

Purely for illustrative purposes, the present invention is described, in accordance with at least one embodiment, for operation in a particular Java Virtual Machine (JVM) implementation. In Java, the system can potentially lock any object by one of two synchronization operations provided by the language. To support locking, the system should potentially provide some unit of state for each object to indicate the object's state with respect to synchronization among various threads.

The Java virtual machine has myriad choices of how to represent the lock state. Some previous systems, such as described in "Thin locks: featherweight synchronization for Java" (Proceedings of the SIGPLAN Conference on Programming Language Design and Implementation, Montreal, Canada, June 1998, by D. Bacon et al.) include a small unit of state in each object to support fast synchronization. This per-object locking state may be termed an object's "lock word", although the actual implementation can be any number of bits in computer memory.

Studies have verified that for many programs, the JVM never locks most objects that are instantiated. The Java programming language provides two mechanisms to lock objects, synchronized methods and synchronized blocks. A synchronized method implicitly locks an underlying object when the method is called. Synchronized blocks lock a method provided as a parameter to the language construct.

With reference to FIG. 1, the present invention, in accordance with at least one preferred embodiment, applies to the representation of some class of state, S, for which each object O in the system must potentially have an instance, SO. Presently contemplated steps that may be carried out are as follows:

1) Predict by some policy the set of objects that will likely use the state S during its lifetime (102). Predictions may be made by a number of methods including static heuristics (one example of such a heuristic is described below), online or offline profiling, static analysis, or a number of other similar methods known to those who skilled in the art.

2) For each object O predicted to use state SO in its lifetime, materialize a representation of the state SO in the object's storage representation (104).

3) For each object O predicted not to use state SO in its lifetime, the following may apply: the first time the system attempts to use this state, materialize storage for SO in an auxiliary data structure called the "nursery," which the system can access by an indirect lookup mechanism (106).

4) As an optional step, at some convenient point during program execution, the system can evacuate the nursery: i.e., for each unit of state SO in the nursery, the system can move this state into the logically owning object O, and modify future execution of the program to access SO directly in the object's representation, for this example, the class of state S in question is the lock word state provided by the system to support fast synchronization (108).

For step 1) above, the system may preferably statically predict that any object of a class that contains one or more synchronized methods will likely use the lock word during the object's lifetime.

For step 2) above, the system will preferably initiate the locking state by including enough bits in the object's storage representation to represent the lock word; for example as described in the previously mentioned work by Bacon et al.

For step 3) above, the system will preferably maintain a hash table, called the lock nursery, which maps objects to lock words. The first time the system tries to lock an object, it first checks if the corresponding lock word appears in the lock nursery. If so, the system reads or modifies the nursery's lock word as needed. If not, the system materializes a new lock word, and inserts it into the lock nursery for use by subsequent operations.

For step 4) above, one may preferably assume that the system uses a standard stop-the-world garbage collector as described Jones Lins, supra. When the system stops all threads to collect garbage, it will also evacuate the lock nursery. Namely, for each lock word in the lock nursery for which the corresponding object is live, the system will change the object's storage representation to include the lock word. The system ensures that future locking operations on such an object use the locally materialized state, and no longer access the lock nursery indirectly.

It should be understood that the embodiment described above represents just one of many possible instantiations of a method according to the present invention, as will be apparent to those skilled in the art.

It is to be understood that the present invention, in accordance with at least one presently preferred embodiment, includes an arrangement for implementing an object model in an implementation of an object-oriented programming language, which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of implementing an object model in an implementation of an object-oriented programming language, said method comprising the steps of:
   predicting a set of objects that will use an object-specific instance of a given state during the lifetime of each object;
   for each object predicted to use an object-specific instance of the given state, materializing a representation of the object-specific instance of the given state in a storage representation of the object;
   providing an auxiliary data structure; and
   for each object not predicted to use an object-specific instance of the given state:
      upon the first attempted use of its object-specific instance of the given state, materializing the object-specific instance of the given state in the auxiliary data structure.

2. The method according to claim 1, wherein the auxiliary data structure is accessible via an indirect lookup mechanism.

3. The method according to claim 1, wherein said step of providing a auxiliary data structure comprises providing a nursery.

4. The method according to claim 3, wherein said step of providing a nursery comprises providing a hash table data structure which maps objects to states.

5. The method according to claim 4, further comprising the step of determining, via examining declared synchronization operations, whether an object will use locking.

6. The method according to claim 1, further comprising the step of evacuating the auxiliary data structure.

7. The method according to claim 6, wherein said evacuating step comprises:
   for each unit of the object-specific instance of the given state in the nursery, moving the object-specific instance of the given state into the representation of the corresponding object; and
   enabling subsequent direct access to the object-specific instance of the given state in the representation of the corresponding object.

8. The method according to claim 6, wherein the auxiliary data structure is evacuated during garbage collection.

9. The method according to claim 1, wherein predicting step comprises developing a prediction based on a declared type for each object.

10. The method according to claim 1, wherein the given state is representative of a per-object state related to locking.

11. The method according to claim 1, wherein the given state is representative of a per-object stare related to profiling.

12. The method according to claim 1, wherein said predicting step comprises, for at least one object, encoding the prediction as a bit in the representation of the object.

13. An apparatus which implements an object model in an implementation of an object-oriented programming language, said apparatus comprising:
   a predictor which predicts a set of objects that will use an object-specific instance of a given state during the lifetime of each object;
   a first materializer which, for each object predicted to use an object-specific instance of the given state, materializes a representation of the object-specific instance of the given state in a storage representation of the object;
   an auxiliary data structure; and
   a second materializer which, for each object not predicted to use an object-specific instance of the given state:
      upon the first attempted use of its object-specific instance of the given state, materializes the object-specific instance of the given state in the auxiliary data structure.

14. The apparatus according to claim 13, wherein the auxiliary data structure is accessible via an indirect lookup mechanism.

15. The apparatus of claim 13, wherein said auxiliary data structure comprises a nursery.

16. The apparatus of claim 15, wherein said nursery comprises a hash table data structure which maps objects to states.

17. The apparatus of claim 13, further comprising an evacuator which evacuates the auxiliary data structure.

18. The apparatus of claim 17, wherein said evacuator, for each unit of the object-specific instance of the given state in the nursery,
- moves the object-specific instance of the given state into the representation of the corresponding object; and
- enables subsequent direct access to the object-specific instance of the given state in the representation of the corresponding object.

19. The apparatus of claim 17, wherein the auxiliary data structure is evacuated during garbage collection.

20. The apparatus according to claim 13, wherein said predictor develops a prediction based on a declared type for each object.

21. The apparatus according to claim 13, wherein the given state is representative of a per-object state related to locking.

22. The apparatus of claim 16, further comprising a determiner which determines, via examining declared synchronization operations, whether an object will use locking.

23. The apparatus of claim 13, wherein the given state is representative of a per-object state related to profiling.

24. The apparatus of claim 13, wherein said predictor, for at least one object, encodes the prediction as a bit in the representation of the object.

25. A program storage device readable by machine, tangibly embodying a program of instructions executable by the machine to perform method steps for implementing an object model in an implementation of an object-oriented programming language, said method comprising the steps of:
- predicting a set of objects that will use an object-specific instance of a given state during the lifetime of each object;
- for each object predicted to use an object-specific instance of the given state, materializing a representation of the object-specific instance of the given state in a storage representation of the object;
- providing an auxiliary data structure; and
- for each object not predicted to use an object-specific instance of the given state:
  - upon the first attempted use of its object-specific instance of the given state, materializing the object-specific instance of the given state in the auxiliary data structure.

* * * * *

UNITED STATES PATENT AND TRADEMARK OFFICE
CERTIFICATE OF CORRECTION

PATENT NO.       : 7,150,009 B2
APPLICATION NO.  : 10/315270
DATED            : December 12, 2006
INVENTOR(S)      : Bacon et al.

It is certified that error appears in the above-identified patent and that said Letters Patent is hereby corrected as shown below:

Column 6, Line 40, "stare" should be --state--

Column 7, Line 23, "determiner" should be --determinor--

Signed and Sealed this

Eighth Day of May, 2007

JON W. DUDAS
*Director of the United States Patent and Trademark Office*